UNITED STATES PATENT OFFICE.

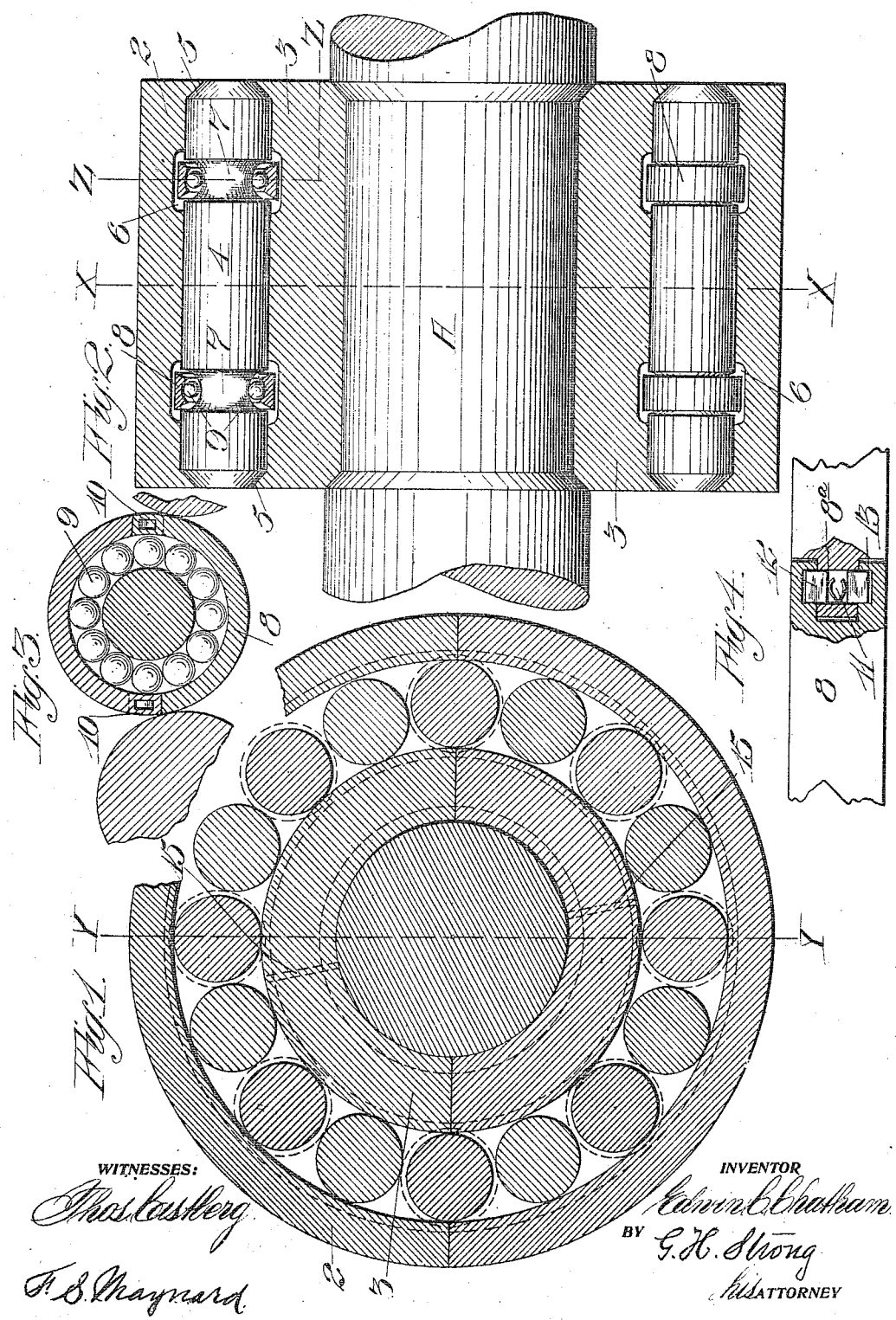

EDWIN C. CHATHAM, OF OAKLAND, CALIFORNIA.

ANTIFRICTION-BEARING.

973,170.  Specification of Letters Patent.  Patented Oct. 18, 1910.

Application filed March 26, 1910. Serial No. 551,781.

*To all whom it may concern:*

Be it known that I, EDWIN C. CHATHAM, a citizen of the United States, residing at Oakland, in the county of Alameda and State of California, have invented new and useful Improvements in Antifriction-Bearings, of which the following is a specification.

My invention relates to improvements in antifrictional bearings for shafts and other revoluble parts.

It consists in the combination of rollers, balls and bearing sleeve, and in details of construction which will be more fully explained by reference to the accompanying drawings, in which—

Figure 1 is a transverse section along the line $x$—$x$ of Fig. 2. Fig. 2 is a section along the line $y$—$y$ of Fig. 1. Fig. 3 is a section along the line $z$—$z$ of Fig. 2. Fig. 4 is an enlarged view of the joint.

It is the object of my invention to provide a combination of roller and ball bearings in such a manner as to reduce the friction to less than could be effected by either of such bearings separately.

In the drawings, A is a shaft which is designed to be supported and turnable within a box or bearing 2. The shaft is here shown with a reduced bearing portion, and around this is loosely fitted a sleeve 3 which may be made of Babbitt or other suitable antifrictional metal. Between the periphery of this sleeve and the box 2 are fitted the rollers 4. The ends of these rollers are beveled as shown at 5, and the ends of the box 2 and the outer periphery of the ring 3 are so formed as to fit these beveled ends as clearly shown in Fig. 2, and when the parts are assembled the rollers are thus prevented from end play. The parts 2 and 3 have grooves or channels 6 opposed to each other, and the rollers 4 have corresponding grooves 7 which register with the grooves 6. I have in the present case shown two sets of these grooves at suitable distances from the ends of the rollers.

8 are rings here shown as having beveled edges and having the interior surfaces made concave, and so formed that the balls 9 lie between the concavities of the grooves 7 and the concavities of the rings 8, these forming the ball races. The rings 8 have a slightly larger diameter than the exterior of the rollers, and as every alternate roller is provided with the grooves and rings, it will be seen that the peripheries of the rings 8 will contact with the intermediate rollers which are not grooved. Thus the independent movements of the rings on the ball bearings, and the independent movement of the interior sleeve 3, provide for the greatest freedom from friction.

In order to assemble the balls within the rings 8, I have shown these rings made in two parts which are united by joints as shown at 10. These joints may be made in any suitable or convenient manner. I have shown them in Fig. 4 as formed by notches in the end of one of the parts 8, and a corresponding tongue 8ª in the meeting end of the other ring, this tongue entering the slot in the part 8. The tongue has an opening made transversely through it, within which is located a spring 11.

12 are locks which fit and are slidable transversely in this opening, and when in position they are forced outwardly by the action of the spring 11, and their outer ends are thus forced into slots or channels 13 which are made in the sides of the slot in the portion 8. Thus when the rings are to be assembled, it is only necessary to compress the blocks 12 against the spring 11 which yields for that purpose sufficiently to bring the outer surfaces of the blocks flush with the surface of the tongue, when the tongue may be entered into the channel in the opposing end, and when the blocks are in line to register with the depressions 13, the spring will force them outward, and thus lock them in place, and the rings will, to all intents and purposes, be solid and continuous. The combined operation will then be that all the rollers form a bearing between the outer case or box 2 and the inner ring 3. The grooves in these parts admit the rings 8 which in turn rest upon the interior balls 9 in the rollers 7. The rings having a slight projection beyond the periphery of the alternate rollers in which they are fitted, will form contact with the intermediate plain rollers, and being freely turnable, will reduce the friction which would otherwise take place between the rollers, whose surfaces will always move in opposite directions. The sleeve 3 being a close turnable fit about the shaft A, it will be seen that any binding or stiffness of movement, of the balls and rollers, if such should occur, will be relieved by the movement of the sleeve, and in like manner the sleeve might move stiffly without interfering with the free movement of the balls and rollers.

Passages 15 may be made through the sleeve so that oil may pass from one bearing surface to the other.

Having thus described my invention, what I claim and desire to secure by Letters Patent is—

1. The combination in a bearing of an exterior box or case, a sleeve fitting and turnable about the shaft, rollers interposed between the periphery of the sleeve and the interior of the box, said rollers having cone-shaped ends and having peripheral grooves or channels removed from the ends, and the ends of the box and sleeve having beveled walls corresponding to the ends of the rollers, balls fitting said grooves or channels, and rings surrounding the balls and confining the latter in the grooves or channels.

2. An antifrictional shaft bearing consisting of an exterior box or case, and an interior sleeve loosely turnable about the shaft, rollers interposed between the sleeve and the interior of the box, said rollers having cone-shaped ends, and alternate rollers having grooves or channels, and the box and sleeve having corresponding grooves, rings fitting said grooves and forming with the rollers ball races, and balls fitting said races and surrounding the rollers, said rollers having cone-shaped ends and said box or case and sleeve having internal end walls fashioned to fit the ends of the rollers.

3. The combination in an antifrictional bearing, of an exterior box, a sleeve fitting and turnable about the journaled portion of the shaft, rollers fitting and turnable between the box and the sleeve, said rollers having cone-shaped ends, and a corresponding formation of the interior of the box and the exterior of the sleeve, grooves formed in the rollers, and corresponding grooves in the case and sleeve, balls fitting said grooves and forming independent bearings for the rollers, and rings surrounding the balls and confining them in place.

4. The combination in an antifrictional bearing, of a sleeve fitting and turnable about the journal portion of a shaft, an exterior box, said sleeve and box having corresponding annular grooves, rollers having grooves which register with those of the box and sleeve, balls fitting said rollers, rings forming with the grooves of the rollers ball races, said rings being fitted to alternate rollers and projecting to form bearing contacts with intermediate plain rollers of the bearing.

5. In a combined ball and roller bearing, a sleeve loosely fitting the journaled portion of a shaft, an exterior box, alternate plain and grooved rollers interposed between the box and the sleeve, rings fitting the grooves, and forming exterior races for the balls, and contacts with the intermediate plain rollers, said rings being made in sections with uniting tongues and grooves, and spring-pressed blocks whereby said meeting ends are locked together.

In testimony whereof I have hereunto set my hand in the presence of two subscribing witnesses.

EDWIN C. CHATHAM.

Witnesses:
G. H. STRONG,
CHARLES EDELMAN.